US011803680B2

(12) United States Patent
Zhao et al.

(10) Patent No.: US 11,803,680 B2
(45) Date of Patent: Oct. 31, 2023

(54) COMPREHENSIVE RECONSTRUCTION METHOD FOR LONG-SERIES SEDIMENT DATA IN DATA-LACKING AREAS

(71) Applicant: Changjiang River Scientific Research Institute, Hubei (CN)

(72) Inventors: Jinqiong Zhao, Hubei (CN); Jinyou Lu, Hubei (CN); Shiming Yao, Hubei (CN); Min Wang, Hubei (CN); Hua Ge, Hubei (CN); Zhanfeng Cui, Hubei (CN); Jie Zhang, Hubei (CN); Ping Gong, Hubei (CN)

(73) Assignee: Chang Jiang River Scientific Research Institute, Hubei (CN)

( * ) Notice: Subject to any disclaimer, the term of this patent is extended or adjusted under 35 U.S.C. 154(b) by 337 days.

(21) Appl. No.: 17/197,017

(22) Filed: Mar. 9, 2021

(65) Prior Publication Data
US 2021/0200924 A1 Jul. 1, 2021

(30) Foreign Application Priority Data
Apr. 28, 2020 (CN) .......................... 202010352075.1

(51) Int. Cl.
*G06F 30/28* (2020.01)
*G01C 13/00* (2006.01)
(Continued)

(52) U.S. Cl.
CPC ........... *G06F 30/28* (2020.01); *G01C 13/002* (2013.01); *G06F 17/15* (2013.01); *G06F 17/40* (2013.01);
(Continued)

(58) Field of Classification Search
CPC .......... G06F 17/15; G06F 17/40; G06F 30/28; G06F 2113/08; G06F 2111/10; G01C 13/002; Y02A 20/152; G01V 99/005
(Continued)

(56) References Cited

U.S. PATENT DOCUMENTS
2021/0326408 A1* 10/2021 Luo .................... G06Q 10/0637

OTHER PUBLICATIONS

Sivakumar et al. , "Deriving high-resolution sediment load data using a nonlinear deterministic approach", Water Resources Research vol. 40, Issue 5, May 2004 (Year: 2004).*
(Continued)

*Primary Examiner* — John H Le

(57) ABSTRACT

A comprehensive reconstruction method for long-series sediment data in data-lacking areas includes steps of: collecting hydrological and sediment data of a target river section; calculating sediment data in data-rich years with a flow-sediment content annual relationship curve method; calculating sediment data in only water quality and sediment test years with a correlation method between water quality and sediment data and hydrological station sediment data; calculating sediment data in data-lacking years with an adjacent station same year flow-sediment content relationship curve method; and calculating sediment data in remaining years with a multi-year average flow-sediment content relationship curve method. The method comprehensively adopts four methods to reconstruct the long-series sediment data based on sediment actual observation and characteristics in the data-lacking areas, which can make up for the limitations and deficiencies between the four methods, and the required data is easier to collect than those in the conventional methods.

3 Claims, 2 Drawing Sheets

(51) Int. Cl.
G06F 17/15 (2006.01)
G06F 17/40 (2006.01)
G06F 113/08 (2020.01)
G06F 111/10 (2020.01)

(52) U.S. Cl.
CPC ....... G06F 2111/10 (2020.01); G06F 2113/08 (2020.01)

(58) Field of Classification Search
USPC .......................................................... 702/12
See application file for complete search history.

(56) References Cited

OTHER PUBLICATIONS

Yamashita et al. "Reconstruction of sediment-transport pathways on a modern microtidal coast by a new grain-size trend analysis method", 2018 (Year: 2018).*

* cited by examiner

United States Patent US 11,803,680 B2

COMPREHENSIVE RECONSTRUCTION METHOD FOR LONG-SERIES SEDIMENT DATA IN DATA-LACKING AREAS

CROSS REFERENCE OF RELATED APPLICATION

The present invention claims priority under 35 U.S.C. 119(a-d) to CN 202010352075.1, filed Apr. 28, 2020.

BACKGROUND OF THE PRESENT INVENTION

Field of Invention

The present invention relates to a technical field of hydrology and sedimentation, and more particularly to a comprehensive reconstruction method for long-series sediment data in data-lacking areas.

Description of Related Arts

Sediment is not only the material basis for changing the shape of the river bed, but also an important carrier of organic matter and pollutants in the water flow. The amount of sand and the size of the particles both affect the direction of river bed deformation. Different combination characteristics of water and sand determine the plane shapes and cross-sectional characteristics of the river bed, which also have direct and indirect effects on the water environment and water ecology. Sediment data are the basic data required for various scientific research, design, and management tasks in river governance, development and protection. However, due to the constraints of natural conditions, historical changes, and economic society development levels, river sediment observation data is relatively lacking, and cannot meet the needs of human beings to understand and protect rivers. Therefore, corresponding reconstruction techniques need to be adopted to obtain sufficient data.

Conventionally, the commonly used reconstruction methods for sediment data in data-lacking areas are as follows: (1) when the flow data series is long, correlation between flow and sediment transport rate or correlation between flow and sediment content of the station can be used for interpolation and extension; (2) when referring hydrological stations of upstream and downstream or adjacent watershed have long suspended sediment data, correlation between the suspended sediment transport or sediment content of hydrological station and the referring hydrological stations can be established for interpolation and extension; (3) a location sediment transport module map is used to estimate the sediment transport, or an analogy method is used to estimate the sediment transport based on the test data of the neighboring and similar watersheds.

However, the above methods have their own limitations. Some have high requirements for the volume of existing data, and some can only infer the characteristic value of sediment transport and cannot obtain the daily sediment concentration process. Therefore, the above methods cannot fully meet the reconstruction needs for the long-series sediment data in data-lacking areas.

SUMMARY OF THE PRESENT INVENTION

In view of the deficiencies of the prior art, an object of the present invention is to provide a comprehensive reconstruction method for long-series sediment data in data-lacking areas, which can be directly applied to sediment research and design in river protection, management and development in data-lacking areas.

The present invention provides a comprehensive reconstruction method for long-series sediment data in data-lacking areas, comprising steps of:

1) collecting hydrological and sediment data of a target river section, wherein the hydrological and sediment data comprises: a hydrological station long-series daily flow $Q_{i,j,k}$, a sediment content $TS_{i,n,k}$ and a flow $q_{i,n,k}$ during sediment test, and a surface sediment test sediment content $C_{i,m,k}$ and a flow $cq_{i,m,k}$ during water quality test, wherein i=1~Nyear, Nyear is long-series years; j=1~Nday(i), Nday(i) is a total number of days in a year i; k=1~Nsta, Nsta is a quantity of hydrological stations; n=1~Nsam(i,k), Nsam(i,k) is a quantity of sediment test samples at a hydrological station k in the year i; m=1~NCsam(i,k), NCsam(i,k) is a quantity of surface sediment test samples of the hydrological station k in the year i;

2) calculating sediment data in data-rich years with a flow-sediment content annual relationship curve method;

3) calculating sediment data in only water quality and sediment test years with a correlation method between water quality and sediment data and hydrological station sediment data;

4) calculating sediment data in data-lacking years with an adjacent station same year flow-sediment content relationship curve method; and 5) calculating sediment data in remaining years with a multi-year average flow-sediment content relationship curve method.

The step 2) specifically comprises steps of:
identifying the data-rich years according to following principles: (1) there are the sediment test samples in each month of a flood season; and (2) annual samples are not less than a certain number Nsmin;
establishing an annual flow-sediment content relationship curve with sediment test data $TS_{i,n,k}$ and $q_{i,n,k}$ of the data-rich years:

$$TS_{i,k}=f_1(q_{i,k}) \tag{1}$$

using a significance level a=0.05 and p<0.01 to test whether the annual flow-sediment content relationship curve established passes a t test; if not, removing the year from the data-rich years; otherwise, calculating daily sediment content data of the year with the equation (1):

$$S_{i,k}=f_1(Q_{i,k}) \tag{2}$$

then counting an annual sediment transport characteristic value:

$$TQS_{i,k}=\Sigma_{i=1}^{Nday(i)}f_1(Q_{i,j,k})\times Q_{i,j,k}\times dt \tag{3}$$

The step 3) specifically comprises steps of:
selecting years having the surface sediment test samples of the water quality test from the data-rich years, and establishing a surface sediment content-flow relationship curve with the surface sediment test sediment content $C_{i,m,k}$ and the flow $cq_{i,m,k}$ of the years:

$$C_{i,k}=f_2(cq_{i,k}) \tag{4}$$

according to the equation (4), calculating an annual surface sediment transport characteristic value:

$$TQC_{i,k}=\Sigma_{i=1}^{Nday(i)}f_2(Q_{i,j,k})\times Q_{i,j,k}\times dt \tag{5}$$

according to the equations (3) and (5), establishing a relationship curve of an annual sediment transport and an annual surface sediment transport of the hydrological station k in years with rich sediment test data and water quality surface sediment test data:

$$TQS_k = f_3(TQC_k) \qquad (6)$$

according to the equations (6) and (4), calculating daily sediment data in years with the water quality surface sediment test data but without the rich sediment test data:

$$S_{i,j,k} = f_3(f_2(Q_{i,j,k}) \times Q_{i,j,k})/Q_{i,j,k} \qquad (7).$$

The step 4) specifically comprises steps of:

selecting years which are data-rich years of both of adjacent hydrological stations k and k+1, and establishing an annual sediment transport relationship curve of the adjacent stations according to the equation (3):

$$TQS_k = f_4(TQS_{k+1}) \qquad (8)$$

using the significance level a=0.05 and p<0.01 to test whether the relationship curve (8) established passes the t test; if not, there is no obvious correlation between the adjacent stations, and the method cannot be applied; otherwise, calculating the sediment data of the same year of the hydrological station k and the data-lacking years with the equation (8) and the equation (2) of a water-sediment relationship curve in the data-rich years of the hydrological station k+1:

$$S_{i,j,k} = f_4(f_{1,k+1}(Q_{i,j,k}) \times Q_{i,j,k})/Q_{i,j,k} \qquad (9).$$

The step 5) specifically comprises steps of:

establishing a multi-year average flow-sediment content relationship curve with the sediment test data $TS_{i,n,k}$ and $q_{i,n,k}$ of the data-rich years:

$$TS_k = f_5(q_k) \qquad (10)$$

for years where none of the three methods of the steps 2)-4) is applicable, calculating the daily sediment content data with the equation (10):

$$S_k = f_5(Q_k) \qquad (11).$$

Beneficial effect of the present invention: compared with the conventional methods, the method comprehensively adopts four methods to reconstruct the long-series sediment data based on sediment actual observation and characteristics in the data-lacking areas, which can make up for the limitations and deficiencies between the four methods, and the required data is easier to collect than those in the conventional methods. As a result, the long-series sediment data can be easily and quickly reconstructed in the data-lacking areas. The method of the present invention can be directly applied to sediment works such as research and design in the protection, management and development of rivers in the data-lacking areas.

DETAILED DESCRIPTION OF THE PREFERRED EMBODIMENT

The technical solutions in the embodiment of the present invention will be clearly and completely described below in conjunction with the accompanying drawings. Obviously, the described embodiment is only one of all embodiments of the present invention. Based on the embodiment of the present invention, all other embodiments obtained by those of ordinary skill in the art without creative work shall fall within the protection scope of the present invention.

Figure 1:
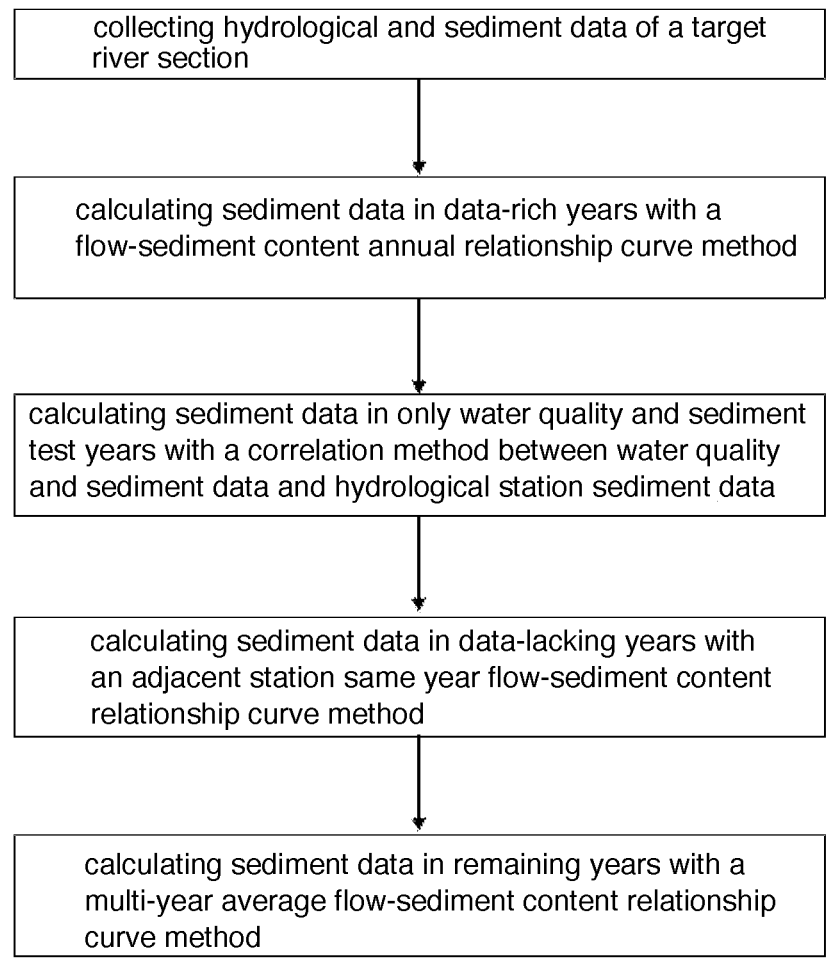
FIG. 1 is a flow chart of a comprehensive reconstruction method for long-series sediment data in data-lacking areas according to an embodiment of the present invention.
Figure 2:
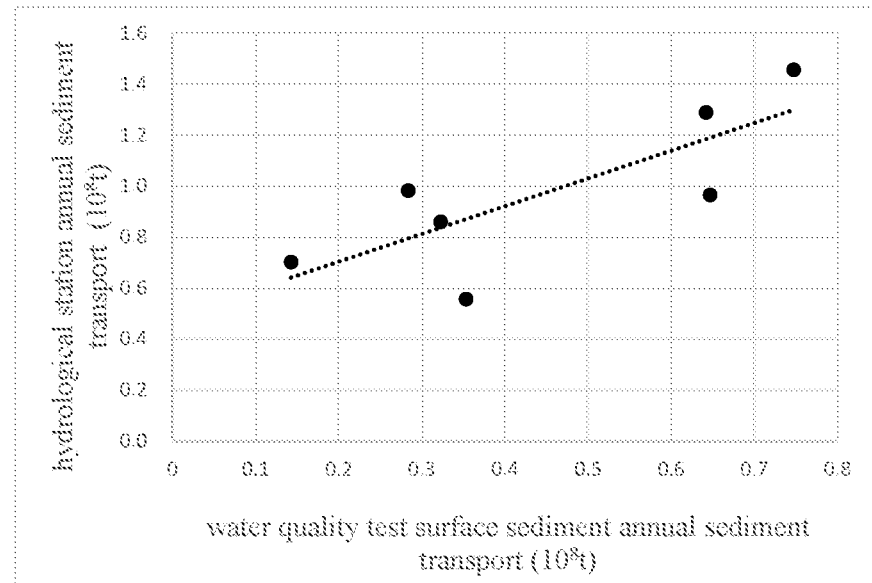
FIG. 2 illustrates a relationship between water quality and sediment data and hydrological station sediment data according to the embodiment of the present invention.
Figure 3:
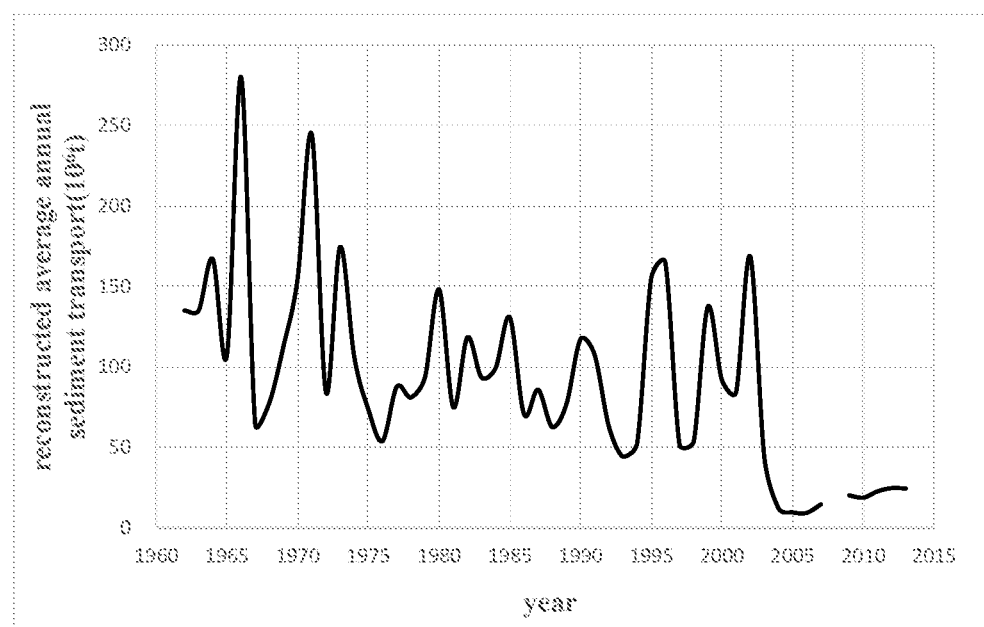
FIG. 3 illustrates a comprehensive reconstruction result of the long-series sediment data according to the embodiment of the present invention.

Referring to FIGS. 1-3, the present invention provides a comprehensive reconstruction method for long-series sediment data in data-lacking areas, whose basic ideas are: first, calculating sediment data in data-rich years with a flow-sediment content annual relationship curve method; second, calculating sediment data in only water quality and sediment test years with a correlation method between water quality and sediment data and hydrological station sediment data; third, for years without rich sediment data or water quality and sediment test, calculating with an adjacent station same year flow-sediment content relationship curve method; and finally, for years where the above three methods are not applicable, calculating with a multi-year average flow-sediment content relationship curve method. Detailed processes of the present invention are shown in FIG. 1.

The technical solutions of the present invention will be further described in detail below with the embodiment and the drawings.

A comprehensive reconstruction method for long-series sediment data in data-lacking areas comprises steps of:

Step 1, collecting hydrological and sediment data of a target river section, wherein the hydrological and sediment data comprises: a hydrological station long-series daily flow $Q_{i,j,k}$, a sediment content $TS_{i,n,k}$ and a flow $q_{i,n,k}$ during sediment test, and a surface sediment test sediment content $C_{i,m,k}$ and a flow $cq_{i,m,k}$ during water quality test, wherein i=1~Nyear, Nyear is long-series years; j=1~Nday(i), Nday(i) is a total number of days in a year i; k=1~Nsta, Nsta is a quantity of hydrological stations; n=1~Nsam(i,k), Nsam(i,k) is a quantity of sediment test samples at a hydrological station k in the year i; m=1~NCsam(i,k), NCsam(i,k) is a quantity of surface sediment test samples of the hydrological station k in the year i;

Step 2, calculating sediment data in data-rich years with a flow-sediment content annual relationship curve method; wherein the Step 2 specifically comprises steps of:

Step 2.1, identifying the data-rich years;

wherein the data-rich years are identified according to following principles: (1) there are the sediment test samples in each month of a flood season; and (2) annual samples are not less than a certain number Nsmin;

Step 2.2, establishing an annual flow-sediment content relationship curve;

wherein the annual flow-sediment content relationship curve is established with sediment test data $TS_{i,n,k}$ and $q_{i,n,k}$ of the data-rich years:

$$TS_{i,k} = f_1(q_{i,k}) \qquad (1)$$

Step 2.3, performing significance level test and calculating the sediment data in the data-rich years:

using a significance level a=0.05 and p<0.01 to test whether the annual flow-sediment content relationship curve established passes a t test; if not, removing the year from the data-rich years; otherwise, calculating daily sediment content data of the year with the equation (1):

$$S_{i,k} = f_1(Q_{i,k}) \qquad (2)$$

then counting an annual sediment transport characteristic value:

$$TQS_{i,k}=\Sigma_{i=1}^{Nday(i)}f_1(Q_{i,j,k})\times Q_{i,j,k}\times dt \quad (3);$$

Step 3, for years without the rich sediment data but with water quality and sediment observation data, calculating sediment data in only water quality and sediment test years with a correlation method between water quality and sediment data and hydrological station sediment data; wherein the Step 3 specifically comprises steps of:

Step 3.1, establishing a surface sediment content-flow relationship curve:

selecting years having the surface sediment test samples of the water quality test from the data-rich years, and establishing the surface sediment content-flow relationship curve with the surface sediment test sediment content $C_{i,m,k}$ and the flow $cq_{i,m,k}$ of the years:

$$C_{i,k}=f_2(cq_{i,k}) \quad (4)$$

Step 3.2, according to the equation (4), calculating an annual surface sediment transport characteristic value:

$$TQC_{i,k}=\Sigma_{i=1}^{Nday(i)}f_2(Q_{i,j,k})\times Q_{i,j,k}\times dt \quad (5)$$

Step 3.3, establishing a relationship curve of an annual sediment transport and an annual surface sediment transport:

according to the equations (3) and (5), establishing the relationship curve of the annual sediment transport and the annual surface sediment transport of the hydrological station k in years with rich sediment test data and water quality surface sediment test data:

$$TQS_k=f_3(TQC_k) \quad (6)$$

Step 3.4, calculating daily sediment data:

according to the equations (6) and (4), calculating the daily sediment data in years with the water quality surface sediment test data but without the rich sediment test data:

$$S_{i,j,k}=f_3(f_2(Q_{i,j,k})\times Q_{i,j,k})/Q_{i,j,k} \quad (7).$$

Step 4, calculating sediment data in data-lacking years with an adjacent station same year flow-sediment content relationship curve method; wherein the step 4) specifically comprises steps of:

Step 4.1, establishing an annual sediment transport relationship curve selecting years which are data-rich years of both of adjacent hydrological stations k and k+1, and calculating the annual sediment transport $TQS_{i,k}$ and $TQS_{i,k+1}$ of the adjacent hydrological stations according to the equation (3), thereby establishing the annual sediment transport relationship curve of the adjacent stations:

$$TQS_k=f_4(TQS_{k+1}) \quad (8)$$

Step 4.2, performing the significance level test:

using the significance level a=0.05 and p<0.01 to test whether the relationship curve (8) established passes the t test; if not, there is no obvious correlation between the adjacent stations, and the method cannot be applied;

Step 4.3, for the stations passing the test in the Step 4.2, calculating the sediment data of the same year of the hydrological station k and the data-lacking years with the equation (8) and the equation (2) of a water-sediment relationship curve in the data-rich years of the hydrological station k+1:

$$S_{i,j,k}=f_4(f_{1,k+1}(Q_{i,j,k})\times Q_{i,j,k})/Q_{i,j,k} \quad (9);$$

and

Step 5, calculating sediment data in remaining years with a multi-year average flow-sediment content relationship curve method; wherein the step 5) specifically comprises steps of:

Step 5.1, establishing a multi-year average flow-sediment content relationship curve with the sediment test data $TS_{i,n,k}$ and $q_{i,n,k}$ of the data-rich years:

$$TS_k=f_5(q_k) \quad (10)$$

Step 5.2, for years where none of the three methods of the steps 2)-4) is applicable, calculating the daily sediment content data with the equation (10):

$$S_k=f_5(Q_k) \quad (11).$$

In addition, although this specification is drafted in accordance with the embodiment, the embodiment may include more than one independent technical solution. The description in the specification is only for clarity, and those skilled in the art should consider the specification as a whole. The technical solutions in the embodiment can also be appropriately combined to form other embodiments which can be understood by those skilled in the art.

What is claimed is:

1. A comprehensive reconstruction method for long-series sediment data in data-lacking areas, comprising steps of:

1) collecting hydrological and sediment data of a target river section, wherein the hydrological and sediment data comprises: a hydrological station long-series daily flow $Q_{i,j,k}$, a sediment content $TS_{i,n,k}$ and a flow $q_{i,n,k}$ during sediment test, and a surface sediment test sediment content $C_{i,m,k}$ and a flow $cq_{i,m,k}$ during water quality test, wherein i=1~Nyear, Nyear is long-series years; j=1~Nday(i), Nday(i) is a total number of days in a year i; k=1~Nsta, Nsta is a quantity of hydrological stations; n=1~Nsam(i,k), Nsam(i,k) is a quantity of sediment test samples at a hydrological station k in the year i; m=1~NCsam(i,k), NCsam(i,k) is a quantity of surface sediment test samples of the hydrological station k in the year i;

2) calculating sediment data in data-rich years with a flow-sediment content annual relationship curve method; wherein the flow-sediment content annual relationship curve method comprises specific steps of:

identifying the data-rich years according to following principles: (1) there are the sediment test samples in each month of a flood season; and (2) annual samples are not less than a certain number Nsmin;

establishing an annual flow-sediment content relationship curve with sediment test data $TS_{i,n,k}$ and $q_{i,n,k}$ of the data-rich years:

$$TS_{i,k}=f_1(q_{i,k}) \quad (1)$$

using a significance level a=0.05 and p<0.01 to test whether the annual flow-sediment content relationship curve established passes a t test; if not, removing the year from the data-rich years; otherwise, calculating daily sediment content data of the year with the equation (1):

$$S_{i,k}=f_1(Q_{i,k}) \quad (2)$$

then counting an annual sediment transport characteristic value:

$$TQS_{i,k}=\Sigma_{j=1}^{Nday(i)}f_1(Q_{i,j,k})\times Q_{i,j,k}\times dt \quad (3);$$

3) calculating sediment data in only water quality and sediment test years with a correlation method between water quality and sediment data and hydrological station sediment data; wherein the correlation method comprises specific steps of:

selecting years having the surface sediment test samples of the water quality test from the data-rich years, and establishing a surface sediment content-flow relationship curve with the surface sediment test sediment content $C_{i,m,k}$ and the flow $cq_{i,m,k}$ of the years:

$$C_{i,k}=f_2(cq_{i,k}) \tag{4}$$

according to the equation (4), calculating an annual surface sediment transport characteristic value:

$$TQC_{i,k}=\Sigma_{j=1}^{Nday(i)} f_2(Q_{i,j,k}) \times Q_{i,j,k} \times dt \tag{5}$$

according to the equations (3) and (5), establishing a relationship curve of an annual sediment transport and an annual surface sediment transport of the hydrological station k in years with rich sediment test data and water quality surface sediment test data:

$$TQS_k=f_3(TQC_k) \tag{6}$$

according to the equations (6) and (4), calculating daily sediment data in years with the water quality surface sediment test data but without the rich sediment test data:

$$S_{i,j,k}=f_3(f_2(Q_{i,j,k}) \times Q_{i,j,k})/Q_{i,j,k} \tag{7};$$

4) calculating sediment data in data-lacking years with an adjacent station same year flow-sediment content relationship curve method;

5) calculating sediment data in remaining years with a multi-year average flow-sediment content relationship curve method; and 6) applying the sediment data to sediment research and design in river protection, management and development in data-lacking areas.

2. The comprehensive reconstruction method, as recited in claim 1, wherein the step 4) specifically comprises steps of:

selecting years which are data-rich years of both of adjacent hydrological stations k and k+1, and establishing an annual sediment transport relationship curve of the adjacent stations according to the equation (3):

$$TQS_k=f_4(TQS_{k+1}) \tag{8}$$

using the significance level a=0.05 and p<0.01 to test whether the relationship curve (8) established passes the t test; if not, there is no obvious correlation between the adjacent stations, and the method cannot be applied; otherwise, calculating the sediment data of the same year of the hydrological station k and the data-lacking years with the equation (8) and the equation (2) of a water-sediment relationship curve in the data-rich years of the hydrological station k+1:

$$S_{i,j,k}=f_4(f_{1,k+1}(Q_{i,j,k}) \times Q_{i,j,k})/Q_{i,j,k} \tag{9}.$$

3. The comprehensive reconstruction method, as recited in claim 2, wherein the step 5) specifically comprises steps of:

establishing a multi-year average flow-sediment content relationship curve with the sediment test data $TS_{i,n,k}$ and $q_{i,n,k}$ of the data-rich years:

$$TS_k=f_5(q_k) \tag{10}$$

for years where none of the three methods of the steps 2)-4) is applicable, calculating the daily sediment content data with the equation (10):

$$S_k=f_5(Q_k) \tag{11}.$$

* * * * *